May 23, 1950            A. WIRTH            2,508,589

PENDULUM-WEIGHT APPARATUS

Filed May 3, 1939                                        7 Sheets—Sheet 1

May 23, 1950     A. WIRTH     2,508,589
PENDULUM-WEIGHT APPARATUS
Filed May 3, 1939     7 Sheets-Sheet 2

Inventor
Armin Wirth
By B. Singer, Atty

May 23, 1950      A. WIRTH      2,508,589

PENDULUM-WEIGHT APPARATUS

Filed May 3, 1939      7 Sheets-Sheet 3

May 23, 1950     A. WIRTH     2,508,589
PENDULUM-WEIGHT APPARATUS
Filed May 3, 1939     7 Sheets-Sheet 4

Fig. 10.

Inventor
Armin Wirth
By Bininger atty

May 23, 1950  A. WIRTH  2,508,589
PENDULUM-WEIGHT APPARATUS
Filed May 3, 1939  7 Sheets-Sheet 5

Fig.11

Inventor
Armin Wirth
By Bilinger, Atty.

May 23, 1950 A. WIRTH 2,508,589
PENDULUM-WEIGHT APPARATUS
Filed May 3, 1939 7 Sheets-Sheet 7

Fig.21.

| | PERIODE | | | | | | | | | | |
|---|---|---|---|---|---|---|---|---|---|---|---|
| PLUNGER 45 | READY REST | | | | | | | | | | |
| FEELER-ROD 17 | CONTACTING RESTING | | | | | | | | | | |
| FEELER-ROD 18 | CONTACTING RESTING | | | | | | | | | | |
| FEELER-ROD 19 & 20 | CONTACTING RESTING | | | | | | | | | | |
| PRINTING | IMPRESSION REST | | | | | | | | | | |
| HAMMER ↑TENSIONING | STROKE ↓ | | | | | | | | | | |
| FEEDING | FORWARD ↑ BACKWARD ↓ | | | | | | | | | | |
| PAPER TENSIONING | TIGHT LOOSE | | | | | | | | | | |

Fig.22.

Inventor
Armin Wirth
By Bihinger Atty

Patented May 23, 1950

2,508,589

UNITED STATES PATENT OFFICE 2,508,589

PENDULUM-WEIGHT APPARATUS

Armin Wirth, Zurich, Switzerland

Application May 3, 1939, Serial No. 271,613
In Switzerland May 10, 1938

Section 3, Public Law 690, August 8, 1946
Patent expires May 10, 1958

27 Claims. (Cl. 346—9)

The present invention relates to a device applicable to a pendulum-weight weighing apparatus and other measuring apparatus for setting weight recording mechanism and type wheels of a printing mechanism for the purpose of enabling the weight of an article to be printed on a paper strip.

Devices of this type are known wherein feelers are moved through a larger or smaller distance relatively to elements provided with steps, according to the magnitude of the load to be weighed and which determines the setting of the stepped elements. Devices are known which enable the weight to be read and also the printing thereof on paper strips.

The present invention relates to those devices which are provided with two actuating or controlling devices. Both actuating or controlling devices are actuated successively at each measuring operation. The first actuating device controls the setting of the stepped elements which in operation have been moved through different distances according to the magnitude of the load to be measured. The second actuating device consists of feelers which set the feelers of the first actuating device. While the parts of the first actuating device are made very light, almost weightless, and are of small dimensions, the parts of the second actuating device are much stronger so that they can set the type wheels directly. It is essential that the impacts and strains which thus occur cannot be transmitted to the very delicate feelers or the extremely accurately constructed stepped elements. The return of the printing mechanism, which naturally must be made strong and is subjected to powerful impacts, is effected in that for the setting of the feelers of the first actuating device there is provided a set of cams which, through resilient members, set setting elements which in turn set the feelers on the stepped elements and which are themselves provided with stepped elements with which the setting elements for the type wheels engage.

The invention also relates to devices which ensure an accurate setting of the feelers on the stepped elements even when weights are indicated and which are located near a higher measuring unit, for example when the load is between 99–100 kg. The new device is also provided with auxiliary means whereby a weighing operation can be printed a number of times, while in this case a safety device is provided so that in both cases there is printed the same weight even when this is located near the upper or lower limit of a unit. By this arrangement provision is made that any impacts applied accidentally to the weighing scale do not influence the result of the weighing or the printing on the paper strip.

The device is also provided with auxiliary means which render it impossible to influence the weighing operation or the printing once the weighing operation has commenced. For this purpose a spring is tensioned by a hand lever on each movement of the lever, this spring then contracting. The setting operations of the feelers and thus of the type wheels take place in such a manner that it is not possible to interfere with the operation by means of the hand lever or the like.

An example of construction in accordance with the present invention is shown in the accompanying drawings, wherein:

Fig. 1 is a front elevation of the feeler mechanism of an automatic scale with five pointer movements, wherein the weight is printed in four places on a paper strip.

Fig. 2 is a detail plan view hereinafter specifically referred to.

Figs. 5 and 6 are detail elevations taken 90° apart, of the actuating device for the feelers.

Fig. 7 is a detail section on the line 7—7 of Fig. 5.

Fig. 8 is a detail view of a device for actuating the driving shaft and the means for storing the force which serves to drive the device.

Fig. 13 is an enlarged detail showing the construction of the steps.

Fig. 19 is a diagrammatic view hereinafter specifically referred to.

Fig. 20 is an enlarged detail view hereinafter again referred to.

Fig. 22 is another diagrammatic view later again referred to.

According to the degree of inclination of the weighing beam 9, four elements 5, 6, 13, 14, each provided with steps, are moved through a greater or smaller distance. A hand lever 95 serves to tension a spring 100. The spring 100, which contracts when the handle 95 is released, turns a shaft 91. Cam discs 115 mounted on the shaft 91 (Fig. 11) actuate four stepped elements 30—33 and, by means of these, four feelers 17, 18, 19, 20 are set relatively to the stepped elements 5, 6, 13, 14. The feelers 17—20 and the stepped elements 30—33 assume different positions according to the step with which the feelers 17—20 come into engagement. The elements 30—33 are provided with steps 111. During the operation of the hand lever 95 and the resulting action of the cams 115 type rods 127 are set on the steps 111. The type rods 127 as a result of their movement produce a corresponding rotation of type wheels 138 of a printing device 136—150.

The weighing machine is constructed as follows:

Of a pendulum-weight weighing machine there is shown in the drawing an arm 9 which rocks more or less according to the weight of the load. By means of a rack 7, which is secured to the arm 9 at 8, a shaft (pointer spindle) 1 is more or less rocked according to the weight of the load. On the shaft 1 there are secured a pointer 2, moving over a scale 3, and a wheel 4 provided with two stepped flanges 5, 6. The arm 9 carries by means of a knife-edge 10 a rod 12. The head of a screw 11 prevents the rod 12 from slipping off the knife-edge. To the rod 12 are secured two rods 13 and 14 provided with steps the rod 13 being shown broken away. To the upper end of the rod 12 there is secured a weight 15 of which the weight is so selected that the parts 12, 13, 14, 15 are held in unstable equilibrium about the knife-edge 10. A pin 16, secured to the frame of the scale, not shown, engages with slots in the rods 13, 14 so that the latter, when the arm 9 is rocked, are guided vertically and, in consequence of the unstable suspension without any disturbing friction on the knife-edge 10.

By applying pressure to the hand lever 95 two feelers 17 and 18 are pressed from the bottom upwardly from their position of rest towards the stepped flanges 5 and 6 through the medium of two stepped levers, 30—31, as soon as the arm 9 and thus the pointer 2 and the shaft 1 with the stepped flanges 5, 6 have come to rest.

At the same time two feelers 19 and 20 are moved upwardly from their position of rest by the hand lever 95 through the medium of two levers 32, 33. Each feeler 19, 20 is hingedly connected with the horizontal arm of a pair of bell crank levers 21, 22. Each bell crank lever is provided with a vertical arm which latter is provided with a shoulder 26. Against the shoulders 26 of the two bell crank levers, there rests a selector 23, 24. Each selector is prevented from dropping out by a pin 29 fixed to a wall of the casing and when it has been moved into the position shown by dotted lines in Figure 1 it always drops into the normal position shown in which it rests on the bracket 25 and the projection 26. Selectors 23 and 24 are slidably mounted on the arms of the bell crank levers by a slot connection, such that vertical sliding movement of the selectors 23 and 24 may be accomplished within the limits of the shoulder 26 and pin 29.

When the feelers 19, 20 are moved upwardly the selectors 23, 24 are moved towards the steps of the rods 13, 14. The selectors 23, 24 are actuated by a bracket 25 secured to the feeler 17 in the manner hereinafter described. Each of the feelers 17—20 is provided with a loop 38, these loops being guided in slots of a guide plate 39, Fig. 3. The feelers 17—20 are thus prevented from turning.

The length of the feelers 17—20 can be adjusted by screws 40. The latter are so engaged with bushes 49 that the points thereof engage with the loop 38 at the points 41 and 42 of the latter and are thus capable of spreading the same. Four further screws 43 and 44 secure the loop 38 which has been adjusted in position and thus ensure that the length of the corresponding feeler 17—20 remains unchanged.

Figures 1, 2, 5, 6, 7, 8:
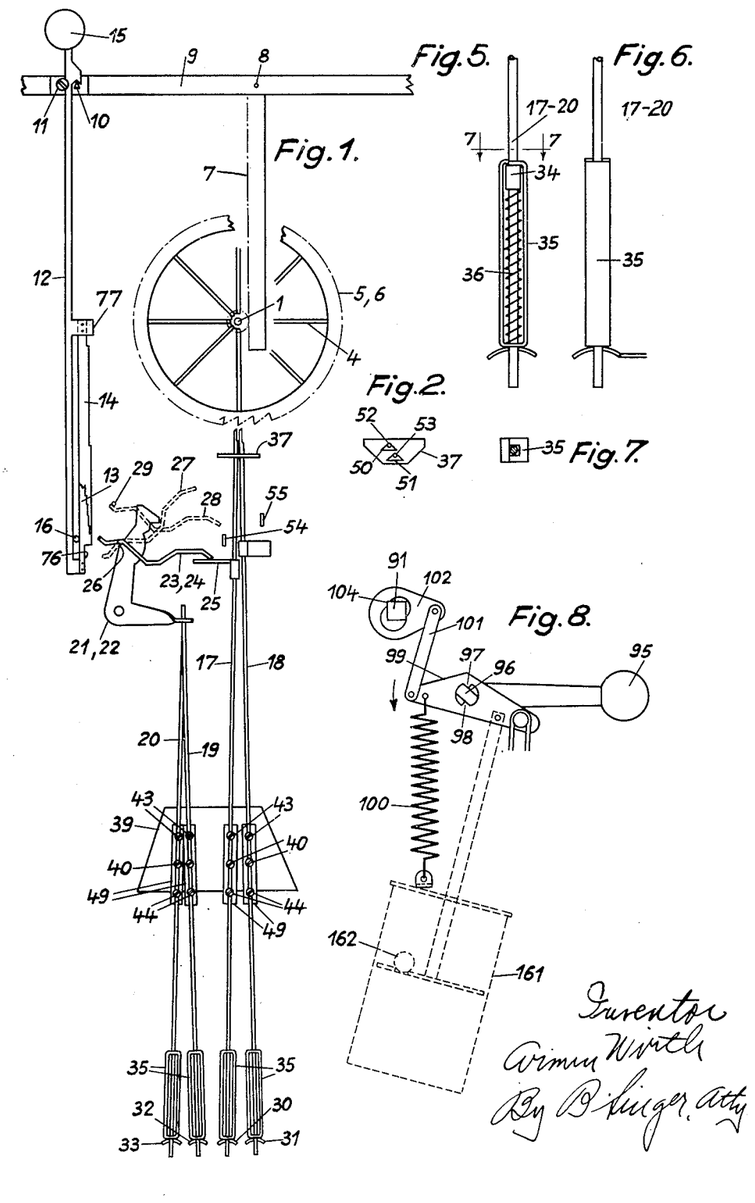

Each feeler 17—20 is provided with an enlargement 34 against which bears the upper end of a spring 36 (Fig. 5). The lower end of the spring 36 bears against the bottom of a strap 35, slidably mounted on the feelers 17—20 and which rests on the horizontal arm 112 of the levers 30—33. When the arm 112 moves upwardly the spring 36 is first compressed; thereupon the feeler is raised.

On the upper end of the strap 35 of each feeler 17 and 18 there rests a plunger 45 (Figs. 3, 11, 12) which is adapted to move the feeler in a horizontal direction. Each plunger 45 is moved over the feelers 17, 18 by a lever 46 (Figs. 3 and 12) through the medium of springs 47, 48 when rotating the shaft 91 by means of a hand lever 95. When the hand knob 95 is moved downwardly the cam 115 will move in a counterclockwise direction from a position of angular displacement clockwise to the position shown in Figure 11 and simultaneously, the projection on the lever 45 will move inwardly as the flat side of the cam moves therebeneath in a clockwise direction to cause the arm 46 to move to the left under the influence of the coil spring 119. Immediately following this operation the flat side of the cam will have moved to the position shown in Figure 11, whereupon the lever 114 will move downwardly and thereby cause the lever 112 to move upwardly and position the feeler rods 17—20. The feelers 17 and 18 are not arranged exactly vertically but are so inclined that they tend to fall forwardly under the action of gravity, that is to say, towards the dial 3. Their upper ends are guided by triangular openings in a plate 37 which is secured in the machine frame. In the normal position the feelers 17, 18 rest against the surfaces 50 and 51. When the lever 46 presses the plunger, through the spring 47, towards the feelers 17, 18, the latter as shown in Fig. 2, come to rest in the corresponding apices 52 and 53 of the openings in the plate 37. When the feelers 17 and 18 in this position are moved upwardly by the levers 30, 31 they meet the corresponding stepped flanges 5 and 6. When, however, they bear against the surfaces 50 and 51 and are moved upwardly in this position they do not meet the stepped flanges 5, 6. The feeler 17 is then located midway between the stepped flanges 5 and 6, while the feeler 18 is located in front of the flange 6. In this case both have their upward movements limited, the feeler 17 by the stop 54 and the feeler 18 by the stop 55. The brackets 25 on the feeler rods 17 and 18 engage the respective stops 54 and 55.

Figure 9:
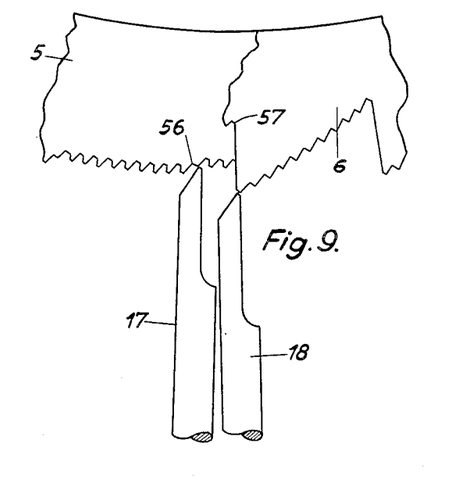
Fig. 9 is a detail view on a larger scale showing the stepped elements actuated by the weighing beam and the corresponding points of the feelers; the figure also shows how the rounding off upwardly or downwardly of the weight to the whole number weight units is effected.
Figure 10:
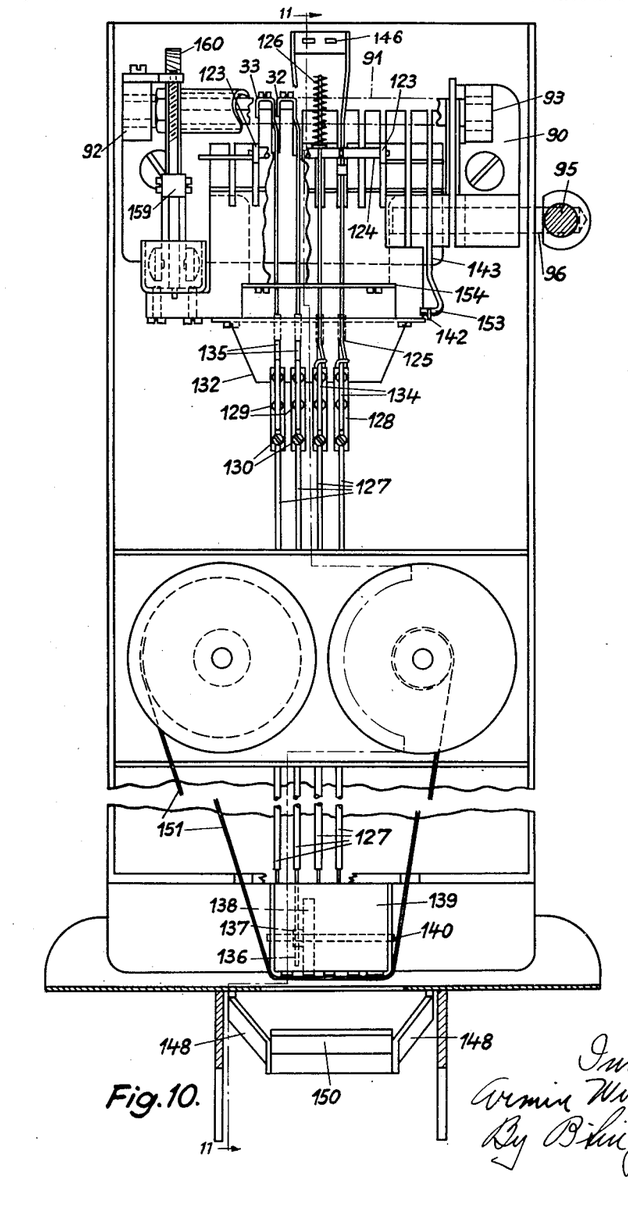
Fig. 10 is an elevation, parts being broken away, of the printing device, together with the second actuating device and the driving mechanism.

The points of the feelers 17 and 18 (Fig. 9), are so spaced in the feeling position that when the point of one feeler 17 bears against a point 56 of a step of the stepped flange 5, the point of the feeler 18 engages adjacent the point 57 of a step of the stepped flange 6 by a fraction of the pitch and vice versa. The feeler 18 consequently moves the stepped wheel 4 towards the right so that the feeler 17 must engage with a toothed space of the stepped flange 5. One edge of the tooth 56 is formed so that the feeler 17 will offer little or no resistance to the movement of the wheel 4 in a direction to the right when the feeler 18 is positioned as shown in Figure 9. This structure produces an accurate reading at the zero and ninety-nine stages of the stepped wheel. One of the feelers 17 or 18 thus moves in the triangular opening of the plate 37 towards one side to such an extent that the two feelers engage with the corresponding steps 56 and 57 (Fig. 9) of their corresponding stepped flanges 5, 6.

Figures 3, 4:
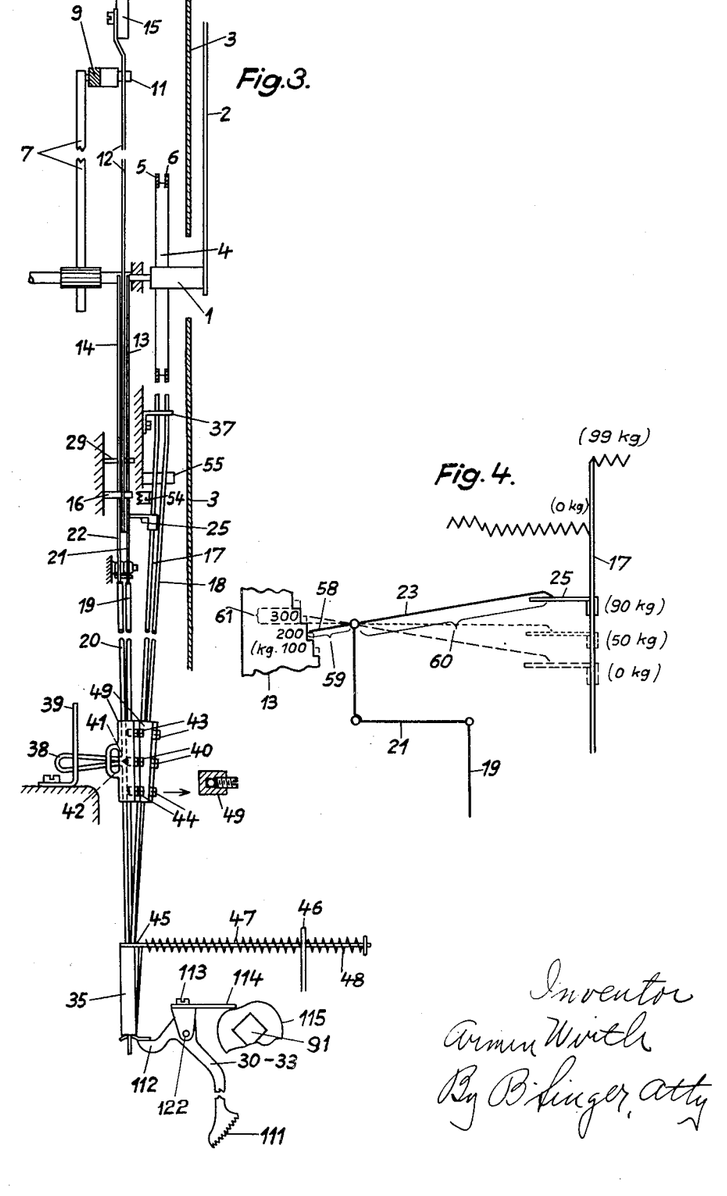
Fig. 3 is a side elevation of the mechanism shown in Fig. 1.
Fig. 4 is a diagrammatic view showing the selection of the steps for higher measuring units.

The stepped rods 13 and 14 carry out a very short movement. The movement of the pointer spindle 1 corresponding to one kilogram in the case, for example, of a 2000 kg. scale, amounts to one tooth of the stepped flanges 5, 6. The movement of the stepped rods 13 and 14, corresponding with this amount, then amounts to about 0.025 mm. The selectors 23, 24 are provided so that when passing from one decimal to the next higher denomination the correct tooth will always be engaged. When the feeler 17 engages, for example, with the 99 kg. step, the selector 23 is raised by the bracket 25 of the feeler 17 to such an extent that the point 58 (Fig. 4) of the selector 23 during the succeeding feeling movement of the feeler 19, is caused by the lever 21 to engage with certainty the correct 200 kg. step of the stepped rod 13. When, however, the feeler 17 engages with the 0 kg. step of the stepped flange 5, the selector 23 assumes the thick broken line position and its point 58 therefore engages with certainty with the step 300 kg. By a suitable selection of the lengths 59 and 60 for the selectors 23, it is possible with a shorter step length 61 for the point 58 of the feeler 23 always to engage with the middle of the corresponding step. In an intermediate position, for example 50 kg., there apply the short thin broken lines for the selector 23, and the stepped rod shown in broken lines (Fig. 4). The selector 23 for the highest digits is controlled in the same way from the feeler 17 when passing from 999 kg. to 1000 kg.

The pressure with which the feelers engage with the stepped elements 5, 6, 13, 14 is very small, about 0.2-10 gr. In consequence of the light pressure the stepped elements 5, 6, 13, 14 and the feelers 17, 18, 23, 24 may be made very light, which permits of very rapid movement of the feelers 17, 18, 23, 24 without damage.

If a movement of the stepped flanges 5, 6 takes place, when the feelers 17, 18 are in engagement therewith, the latter can move along one side of the triangular openings in the plate 37 and thus move in the direction of the pointer spindle until they drop from the stepped flanges 5, 6. When the stepped rods 13 and 14 move downwardly during the feeling operation the selectors 23, 24 move into the broken line position 27 shown in Fig. 1, while during the downward movement of the stepped rods 13 and 14 the selectors can move into the broken line position 28. Immediately the feelers 19 and 20 have been drawn back they fall into their normal position. The selectors 23, 24 are attached or freely supported on the bell crank arms 21, 22 by a slot connection (not shown) which permits vertical sliding movement of the selectors 23, 24 on the vertical arms of the bell crank levers 21, 22 within the limits of the shoulder 26 and pin 29. Thus, it will be seen that the selectors 23, 24, while normally resting upon the shoulder 26, may be kicked upwardly when the rods 13 and 14 move upwardly such as when the load on the scale has been removed without causing the selectors 23, 24 to be displaced. Normally, the selectors 23, 24 are supported with one end of the bracket 25 and the opposite end supported on the shoulder 26. Thus, the shoulder 26 is simply a projection formed integral with one edge of the upwardly extending arms of the bell cranks 21, 22 and extend in the same plane.

Figures 14, 15, 17:
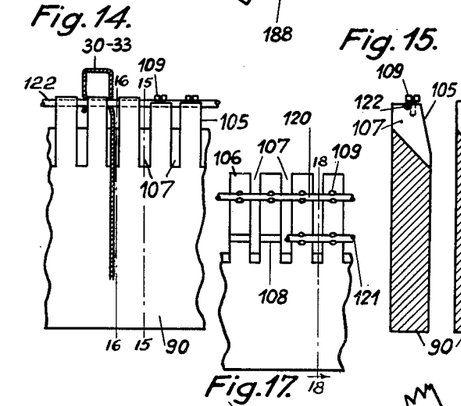
Fig. 14 is a detail elevation of the rail 90.
Fig. 15 is a section on the line 15—15 of Fig. 14.
Fig. 17 is a detail elevation of the rail having the bearing members 106.
Figures 16, 18:
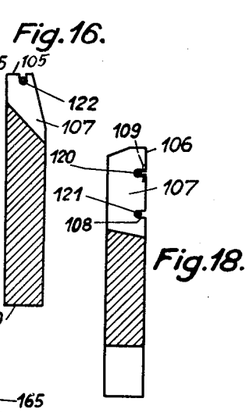
Fig. 16 is a section on the line 16—16 of Fig. 14.
Fig. 18 is a section on the line 18—18 of Fig. 17.

The setting levers 30—33 (Figs. 3, 11, 14) are all mounted on a common shaft 122, which is mounted in a rail 90 secured to the framework. Each setting lever is provided on an arm in the form of a blade spring 114. The arm 114 is held in place by means of a screw 113. A spring 116 secured to the arm 113 presses the blade spring 114 against a cam disc 115. All the cam discs 115 are mounted on a common shaft 91. Each setting lever 30—33 is provided with an arm with teeth 111. These teeth are located at different distances from the shaft 122. When turning the shaft 91, and thus the cam discs 115, four type rods 127 are brought into engagement with the teeth 111. The type rods 127 serve to set the type wheels 138 of the printing mechanism. For setting the type rods 127 there are provided four levers 123 which are mounted on the shaft 120. Each lever 123 bears with an arm against the cam 115 on the shaft 91, while the other arm thereof is connected to a shaft 124. On the shaft 124 are mounted four actuating rods 125. Between the shaft 124 and the upper end of the actuating rod 125 is provided a spring 126. Each actuating rod 125 engages with its lower end in a loop 134 of the type rod 127. The loop 134 is adapted to be spread by means of a screw 129 and is secured by screws 130 and a bush 128. Each type rod 127 is provided at the bottom with a rack 136 which engages with a pinion 137 on the type wheel 138. Directly adjacent the point 131 of each rod 127 there is secured an arm 141. A hook 142, provided on the arm 141, cooperates with a hook 153 of a locking lever 143 in such a manner that the type rod 127, and thus the type wheel 138, can be locked in predetermined positions. The point 131 and the loop 134 of the type rod 127 are guided in slots 133 and 135 of a plate 132 so that the point 131 enters correctly the teeth 111 of the corresponding setting lever 30—33.

The locking levers 143 are rotatably mounted on a shaft 121. The locking levers 143 are connected, by means of a rod 149 and a link 147, to an arm of a hammer lever 148 which carries a rubber hammer 150 adapted to strike against the type wheels 138. The hammer 148, 150 is subjected to the action of a spring 146. Each locking lever 143 is provided with a projection 145. With this projection 145 there engages a pawl 144. The pawls 144, are mounted on a shaft 120 mounted in the bearing 106. On the shaft 120 are also mounted the levers 46 which actuate the plungers 45. A spring 119 presses the projections 118 of the levers 46 against the cams 115. The lever 123 and the pawl 144 move simultaneously. When the pawl 144 releases the locking lever 143 the spring 146 can expand, this spring being attached to the rod 149 by the link 147. The hammer 150 presses an inking ribbon 151 and a paper strip guided by the guide 173 against the types which are set on the type wheel 138.

The shaft 91, by the rotation of which the cams 115 and all the feelers 17—20, 30—33 and 127 are actuated, is rotated by the hand lever 95. To the lever 95 (Fig. 8) is secured a short shaft 96 which, when the lever 95 is depressed, moves with it, through the medium of the projections 97 and 98, a double-armed lever 99. A spring 100 is thus tensioned and when the lever 95 is released serves to return the parts of the actuating mechanism into their initial position. An upward movement of the hand lever 95 therefore no longer affects the operation of the actuating mechanism. To the lever 99 is connected, by means of the link 101, the disc 102 which is mounted on a square portion of the shaft 91 and serves as a ratchet pawl. When the hand lever 95 has completed its downward movement the disc 102 turns the shaft 91, through the medium of the projection 104, through 90°. When releasing the hand lever 95, the parts 95 to 102 are returned into their original position by the spring 100. The pawl disc 102 thus turns the cam shaft 91 through 90° (Fig. 8).

This movement of the shaft 91 produces the setting of the feelers 17—20 and the setting levers 30—33 during the actuation of the printing mechanism which requires a greater force and is derived from the shaft 96. An arm 103 mounted on the shaft 96 moves the bell crank lever 143, mounted on the shaft 121, which tensions the spring 146 by means of the rod 149. As for the setting of the levers 30—33, only small forces are available; it is necessary for them to be mounted with the minimum amount of friction and at the same time with the greatest accuracy and rigidity. The levers 30—33 are bent in the form of a U and both limbs thereof are mounted on the shaft 122. The latter is itself supported at a short distance from the rod 105 between the slots 107 and is secured by clamping screws 109 in grooves 108 (Figs. 14, 15, 17 and 18). The lever 46 which controls the movement of the plungers 45 is of U-shape, the two limbs being mounted in slots 107 and on the shaft 120.

Figures 13, 19:
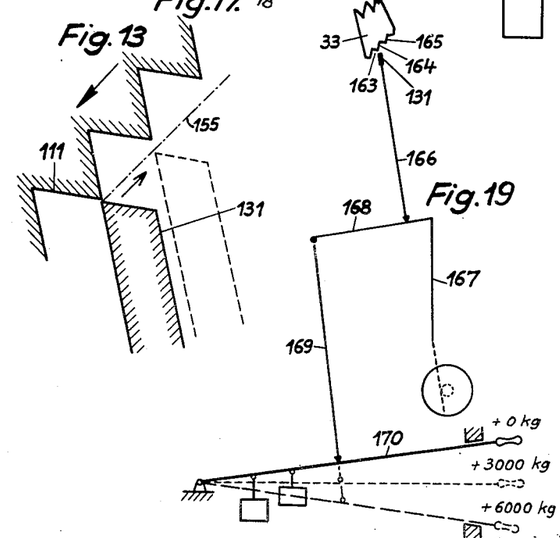

When the point 131 of the type rods 127 engages with the teeth 111 of the corresponding levers 30—33, the pressure spring mounted on each rod 125 is tensioned. Each of the type wheels 138 is turned more or less according to the position of the levers 30—33. In consequence of the inclination of the type rod 127, the type rod tends to bend towards the right when the point 131 meets the teeth 111 (Fig. 13). This is possible in so far as the slot 133 permits of a movement of the type rod 127. By this slight movement towards the right the arm 141 of the type rod 127 is also moved. Its hook 142 is released from the hook 153 of the lever 143. When the pawl 144 slides off the projection 145 the lever 143 is also released. At the same time the teeth 136 on the type lever 127 engage with the toothed wheel 137.

If, as above described, one of the feelers 17, 18 is disengaged from the toothed flange 5, 6 and comes to lie adjacent to this, the levers 30—33 would be swung outwardly to such an extent that the point 131 of the type rod 127 would be moved to the right (Fig. 11) adjacent the teeth 111. The point 131 then meets a bracket 154 provided with slots. The corresponding type rod 127 does not move the arm 141 sufficiently to enable the hook 142 to release the hook 153. The locking lever 143 is thus not released and the spring 146 cannot engage the printing mechanism. When the printing mechanism is actuated and the scale gives an indication below zero, the selectors 23 and 24 come into contact with the step 76 of the stepped rods 13 and 14. This step is deeper than the last printing step 9.90 and so forth, so that in consequence of the excessive movement the printing mechanism is locked.

Figure 11:
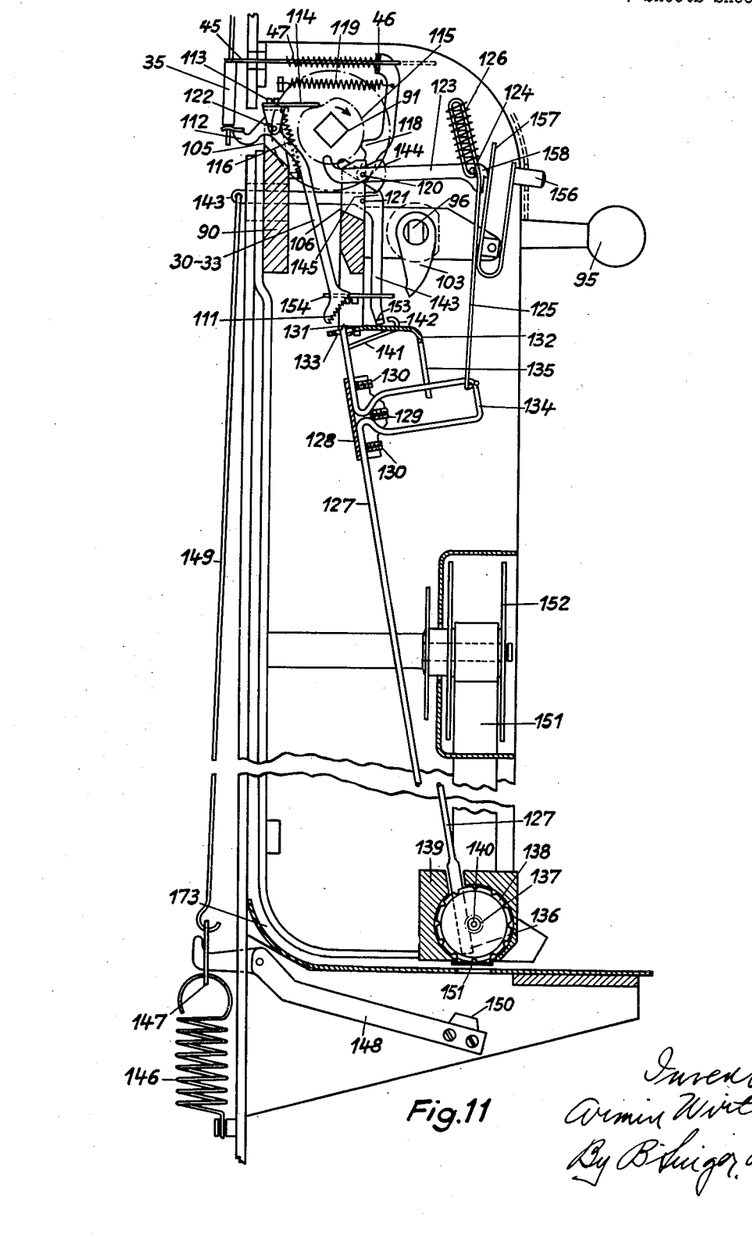
Fig. 11 is a vertical longitudinal section taken approximately on the line 11—11 of Fig. 10.
Figure 12:
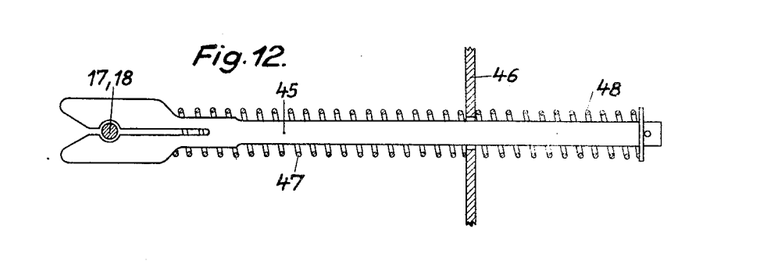
Fig. 12 is a detail view of an actuating member for the feelers of the first actuating device.

The same occurs when one of the points of the feelers 19, 20 for any reason, for example by coming into contact with one of the selectors 23 and 24 (Fig. 1), meets the locking step 77 (overloading the scale) or when in consequence of any obstruction the type wheels 138 do not rotate freely. Assuming for example that one of the type rods 127 is held fixedly by the tooth 111 but that the tensioned spring has been drawn upwardly by the rod 125, the type rod 127 will move outwardly, that is to say the point 131 is moved to the left (Fig. 11). Consequently the locking levers 143 are only released and printing becomes possible when all the points 131 engage correctly with the corresponding levers 30—33.

However a further precaution is necessary in order to exclude the last possibility of error. Should a disturbance take place in the equilibrium of the scale during a printing operation at the moment at which the feeling operation of the first feeling mechanism has been completed, while the type rods 127 are already in operation, the possibility may arise that one of the type rods 127 will still engage, in consequence of the downward movement of the feelers 17, 18 from the stepped flanges 5, 6, with one of the teeth of the levers 30—33 which are in movement. This would produce a defective printing.

In order to prevent this error, provision is made that the rod point 131 is only set in motion at such a speed, by the corresponding shape of the associated cam 115, that, should the correct teeth 111 not be engaged, the speed of the succeeding teeth is slower relatively to the speed of movement of the point 131. The point 131 describes the path 155 shown diagrammatically in Fig. 13.

When it is desired to effect a repetition of the printing, then on repeated actuation of the printing mechanism, while the load has remained stationary, there is the liability that during the second printing operation the weight is rounded off differently than during the first printing operation so that the figures of the two impressions differ from one another. In order to remedy this defect the following arrangement is provided.

After actuating the hand lever 95 pressure is applied to the knob 156 during the course of the printing operation. This knob pushes the spring 157 under the projection 158 of the lever 123. The latter and thus the type rod 127 is consequently held fixedly in the printing position while all the remaining operations take place without obstruction. When the printing mechanism is again actuated, whether in the meantime the scale has been moved or not, there is effected the same printing by the type wheels 138 with the original setting of these type wheels. Shortly before effecting the printing there occurs a slight upward movement of the lever 123 by the cam discs 115 whereby the spring 157 which engages with the projection 158 drops forwardly. If as a result of again actuating the knob 156 a second repetition—that is to say, a third printing operation is to be initiated—the printing apparatus and the scale, after the completion of the second printing operation (first repetition) is again in readiness for a fresh weighing operation. In order that the printing operation takes place in the prescribed time and uniformly, there is provided a speed governor, which is in the form of a centrifugal governor 159 which is mounted for example on the shaft 91. The governor can be driven by a worm wheel 160 mounted on the shaft 91. A fluid brake 161 may also act on the lever 99. The brake may, for example, by means of a ball valve 162, oppose a slight resistance to movement when tensioning the lever 95, while the course of the printing operation takes place solely by reason of the considerable resistance.

Figure 20:
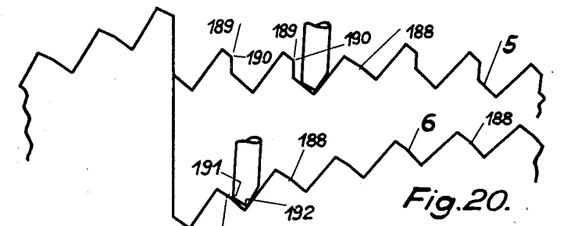

The shape of the teeth of the stepped flanges 5 and 6 is so selected that during the feeling operation of the stepped wheel which is in movement, the parts of the feelers and teeth which first come into engagement with one another have surfaces which are approximately parallel so as to avoid damage to the sensitive points. The engagement of the feelers with the teeth must not take place at the points of the teeth as otherwise the accurate pitch would be interfered with, this being essential as regards the correct rounding off up and down. The feeler must also not engage with the tooth gap as this is essentially for the correct path of the feeler. Engagement at the points 188 and 199 is displaced (in Fig. 20 relatively to the tooth space) on the left hand flank. It takes place with rising steps at a very obtuse angle so that when machining the next succeeding tooth to the complete depth no shaving is formed. When the steps remain uniform there is formed a shaving 190, but this is located at a point and is of such a shape that it does not cause any inconvenience.

The shape of the feelers and of the teeth of the steps must intentionally be such that the feeler point does not engage completely with the tooth gaps but engages the flanks of the tooth by means of two edges 191 and 192. In this manner soiling or sticking of the parts is prevented as, in consequence of the high surface pressure, any dirt will be displaced. Further, the slight wear of the point of the tool, as is unavoidable when machining the tooth gap, does not have any disturbing effect.

The method of operation is as follows:

After the load to be weighed has been placed on the scale the stepped elements 5, 6, 13, 14 are moved. The hand lever 95 is now depressed and again released. The shaft 91 and the cam discs 115 are consequently turned and by means of the arm 103, the bell crank lever 143 and the rod 149, the spring 146 is tensioned. The cams 115 move the levers 30—33 and these move the feelers 17—20 towards the stepped elements 5, 6, 13, 14. According to the tooth with which the feeler elements engage, the levers 30—33 are moved more or less and thus bring various teeth 111 in the path of the type rods 127. The latter are moved upwardly by the cams 115 through the medium of the levers 123, the rods 125 and the loops 134 and thus move the type wheels 138 through a greater or lesser extent.

The elements 30—33 and 112 are yieldingly urged upwardly by the coil spring 116 (Fig. 11) when the cam 115 is moved to the position shown in Figs. 3 and 11 from its initial position in which the flat portion of the cam is angularly displaced clockwise. Normally, the elements 30—33 and lever arms 112 are held in their lower positions by the arm 114 engaging the high or raised portions of the cams 115, and when the flat side of the cam approaches the lever 114 from its angularly displaced clockwise position it permits the lever 114 to move downwardly and allows the levers 112 to move upwardly. In other words, the cam 115 as shown in Figs. 3 and 11 is in its angularly displaced position from its initial position of rest, or a position of angular displacement clockwise approximately 90°. Thus, when the operating knob 95 is moved downwardly from its rest position in Fig. 8, the shaft 91 and cam 115 will be displaced counter-clockwise an angular distance of 90° to move the flattened portion of the cam under the arm 114. This movement permits the lever 114 to move downwardly under the influence of the coil spring 116 and thus move the arms 112 upwardly. The upward movement of the arms 112 moves the rods 17—20 in a corresponding direction so that the feeler points will engage the notches in the flanges 5 and 6, and the selector levers 21—22 accordingly will be engaged with the suspension rods.

Figure 21:
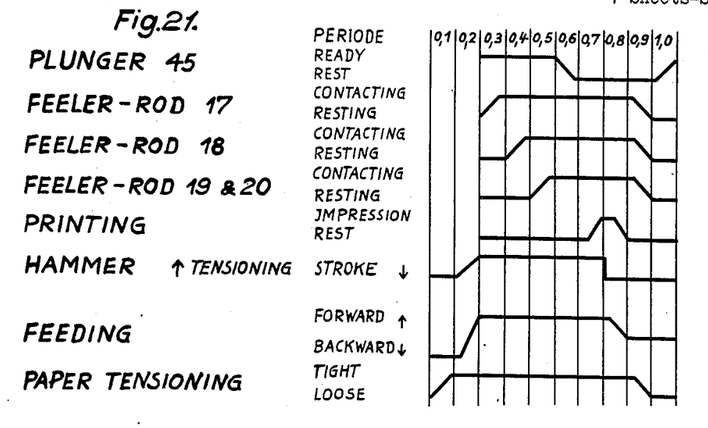
Fig. 21 is a diagrammatic view showing the method of operation of the actuating mechanism and the sequence of operation of the separate members.
Figure 22:
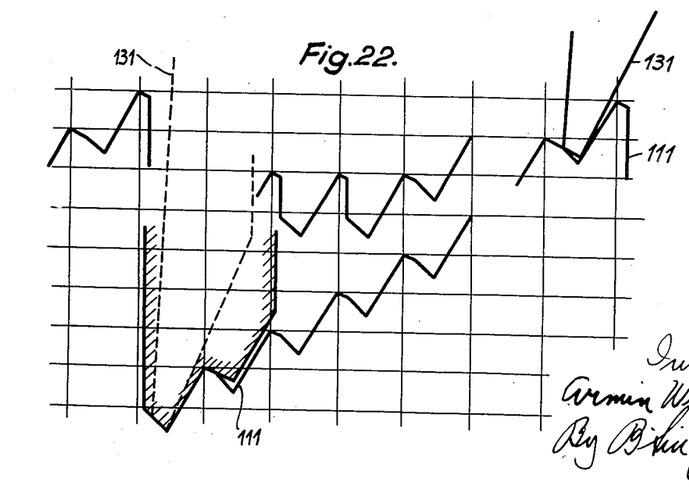

The operations take place according to the following phases (see Fig. 21). The cam 115 is so shaped as to cause the various control levers 114, 123, 143 and detent 144 to operate in sequence in the following manner, and for an indicated time period relative one to the other. The chart in Figure 21 shows the sequence of operations by the various curves. The upper level of the curves are to be read in conjunction with the first, third, fifth, seventh, ninth etc. legends to the left beneath the title legend "phase," while the lower level of the curves are to be read in conjunction with the alternate legends. Thus, under the legend "plunger" to the extreme left appears the sub-legends "ready-rest." The upper level of the curve is read in conjunction with the legend "ready," while the lower level of the curve is read in conjunction with the legend "rest." For the various time periods 0.1 to 1.0 or intervals of time.

*Phase 0.1.*—In the position of rest the levers 30—33, resting on the arms 112, are in their lower end position. The lever 46 is already at the left (Fig. 3).

*Phase 0.2.*—The pressure spring 47 pushes the plunger 45 and thus the feelers 17 and 18 into the apices 52 and 53 of the guide 37.

*Phase 0.3.*—The feeler lever 30 and therewith the feeler 17 move upwardly until the feeler 17 meets the stepped flange 5.

*Phase 0.4.*—The lever 31 and therewith the feeler 18 move upwardly until the feeler 18 meets the stepped flange 6 (should the feeler accidentally engage with a point it is brought into the correct position by the feeler 18 in the manner above described).

*Phase 0.5.*—The levers 32 and 33 and therewith the feelers 19 and 20 bring, by means of the bell crank levers 21 and 22, the selectors 23 and 24 into contact with the stepped rods 13 and 14. In this case, in consequence of the action of the bracket 25 and a further similar bracket on the feeler 18, the correct step is also selected in limiting cases on the stepped rods 13 and 14.

*Phase 0.6.*—The lever 46 moves towards the right, the pressure spring 47 is expanded and the guide plungers 45 no longer transmit any forces to the feelers 17 and 18.

*Phase 0.7.*—There is now effected the printing up to and including phase 0.8.

*Phase 0.9.*—The levers 30—31 and with them the levers 17 and 19 are withdrawn from the stepped wheels 5, 6 and the selectors 23 and 24 from the stepped rods 13, 14 and are returned into their initial position.

*Phase 1.0.*—The levers 46 move towards the left and through the pressure springs 47 move the plungers 45 and thus the feelers 17 and 18 into engagement with the apices 52 and 53 of the guide 37. The starting position is thus again reached.

The duration of the phase 0.2 to 0.6 is extremely short and according to the size of the apparatus varies between 0.2 and 0.6 second.

At the commencement of the feeling operation (phase 0.3) the guide plungers 45 press the feelers 17 and 18 into the apices 52 and 53 of the guide. During the phases 0.3, 0.4 and 0.5 there are effected the forward movements of the feelers and immediately after (phase 0.6) there disappears the guiding pressure of the plungers 45 and the feelers 17 and 18 only remain in contact with the base of the step in consequence of friction. In the case of very slight forces acting in the direction of the pointer axis they slip laterally out of the steps and move upwardly adjacent the stepped flanges. For reducing this friction the feelers 17 and 18 are intentionally inclined so that by reason of the natural frictional engagement they do not slide axially from the base of the step. The angle of inclination of the feelers is so selected that the feelers are at the limit of frictional self-locking or a spring is so arranged that the feelers 17 and 18 are easily drawn outwardly but the friction in the bottom of the step is not overcome completely. Also the angle of the guide triangles 52 and 53 is so selected that under satisfactory efficiency and with a suitable transmission or proper wedge angle the peripheral forces at the stepped flange, due to disturbance of the oscillating movement of the scale, are converted into axial forces which push the feeler away from the bottom of the step. By a correct selection of all the factors, pressure of the feeler, suitable angle of the feelers near the position of frictional self-locking, cessation of plunger pressure after the completion of the feeling operation during a sufficiently long period of time (about 0.15 sec.) and a suitable angle of the guiding triangle, it is possible to overcome the pressure already when there is a disturbance of the equilibrium through 1—3 feelers.

In order to increase the weighing range there is provided a device for adding capacity-increasing weights. In order also to obtain the correct printing in this case, an addition of the normal dial indication and of the load balanced by the capacity-increasing device is necessary (Fig. 19). The corresponding lever 33 is provided in the present example (3000 kg. scale—2 x 3000 kg. additional) with three steps. The step 163 indicates 0 kg., the step 164 indicates 1000 kg., and the step 155 indicates 2000 kg. When now the load for example is 5000 kg. and the printing mechanism, before enlarging the normal weighing range by the additional capacity-increasing mechanism, is actuated, no printing occurs as the point 131 does not engage with any step of the lever 33 and thus the locking arm 141 locks the printing mechanism. When a capacity weight of 3000 kg. is added, the pointer moves on the indicator dial to 2000 kg. In this case the type rod of the highest decimal is divided into two parts 166 and 167. These are connected together by a lever 168 which is connected by the pull rod 169 to the additional mechanism 170. By the additional mechanism the distance from the point 131 to the lower part of the type rod 167 is reduced by the amount which moves the type wheel through three units. The same occurs when further additions of capacity weights are made. Printing in all these cases is only possible when the scale moves within the dial scale and in all these cases there is positively effected the printing of the correct weight.

In the case of scales for persons for weighing themselves it is very difficult to obtain a correct printing as by tensioning the hand lever the scale becomes unsteady and in consequence of the locking arrangement above described it is not possible to effect printing. In this case provision is made for firmly holding the depressed hand lever 95 for a few seconds by any suitable delay mechanism, whereupon the printing is effected as above described.

According to the invention the dimensions of the majority of parts are made much smaller than is otherwise usual when constructing similar parts and devices.

The round cross section of the feelers 17—20 lies preferably between 3–0.08 sq. mm., the tangential step pitch of the elements 13, 14 between 1 and 0.2 mm., the radial step pitch of the elements 5, 6 between 1 and 0.1 mm., the axial thickness of the step flange 5, 6 between 1 and 0.1 mm., the cross section of the type rods 127 from 8 to 1.5 sq. mm., and the path of the type rods 127 from 10 to 5 mm. By "five pointer mechanism" is meant apparatus in which four successive digits are printed and controlled, while the fifth digit is operated by the additional weight apparatus shown in Fig. 19.

I claim:

1. In weighing apparatus, having a weighing beam, a printing mechanism, two controlling mechanisms each including feelers and stepped elements, means governed by said beam for operating said controlling mechanisms successively after being adjusted by the scale, means whereby the first controlling mechanism controls the setting of the stepped elements of the second controlling mechanism to be actuated, and means to effect operation of said printing mechanism according to the setting of said controlling mechanisms.

2. In weighing apparatus, a weighing beam and a printing mechanism, two sets of stepped elements, operative connections between said beam and said sets of stepped elements whereby said sets of stepped elements are positioned according to the various positions of the weighing beam, a first and a second actuating and controlling mechanism, each comprising sets of feelers and stepped feeler levers, said feeler levers by their positions governing the operation of the printing mechanism, one set of feelers cooperating directly with one set of stepped elements, selectors for cooperatively connecting the other set of feelers with the other set of stepped elements, means carried by the first set of feelers for setting the selectors of the second set of feelers, said printing mechanism including type wheels and type-wheel rods and a printing hammer, and means including cams for actuating said feelers, said type-wheel rods and said hammer.

3. In weighing apparatus, a weighing beam and a printing mechanism, two sets of stepped elements, operative connections between said beam and said sets of stepped elements whereby said sets of stepped elements are positioned according to the various positions of the weighing beam, a first and a second actuating and controlling mechanism, each comprising sets of feelers and stepped feeler levers, said feeler levers by their positions governing the operation of the printing mechanism, one set of feelers cooperating directly with one set of stepped elements, selectors for cooperatively connecting the other set of feelers with the other set of stepped elements, arms carried by the first set of feelers for setting the selectors of the second set of feelers, said printing mechanism including type wheels and type-wheel rods and a printing hammer, and means including cams for actuating said feelers, said type-wheel rods and said hammer, the set of stepped elements which cooperate with the feelers and feeler levers that control the type-wheel rods of the wheels of the higher denominations traversing a substantially shorter path than the other set of stepped elements which cooperate with the feelers and feeler levers that control the type-wheel rods of the wheels of the lower denominations.

4. In weighing apparatus, a weighing beam and a printing mechanism, two sets of stepped elements, operative connections between said beam and said sets of stepped elements whereby said sets of stepped elements are positioned according to the various positions of the weighing beam, a first and a second actuating and controlling mechanism, each comprising sets of feelers and stepped feeler levers, said feeler levers by their positions governing the operation of the printing mechanism, one set of feelers cooperating directly with one set of stepped elements, selectors for cooperatively connecting the other set of feelers with the other set of stepped elements, said printing mechanism including type wheels and type-wheel rods and a printing hammer, and means including cams for actuating said feelers, said type-wheel rods and said hammer, the set of stepped elements which cooperate with the feelers and feeler levers that control the type-wheel rods of the wheels of the higher denominations traversing a substantially shorter path than the other set of stepped elements which cooperate with the feelers and feeler levers that control the type-wheel rods of the wheels of the lower denominations.

5. In a weighing apparatus, a weighing beam, a rotatable shaft, a rack and pinion connection between said beam and said shaft, a wheel on said shaft having two stepped flanges, a rod suspended on a knife edge from said beam and weighted to be in unstable equilibrium, said rod carrying two stepped elements, four stepped feeler levers, a first pair of feelers normally resting on two of said feeler levers, a second pair of feelers normally resting on the other two of said feeler levers, selector carrying bell cranks one connected to each feeler of the second pair, a selector carried by each bell crank, means on the feelers of the first pair for affecting the positions of said selectors with respect to their bell cranks, under predetermined conditions, a printing mechanism whose setting is governed by the positions of said feeler levers' steps, and manually controlled means for effecting the positioning and action of said feeler levers and for operating the printing mechanism.

6. In a weighing apparatus, a weighing beam, a rotatable shaft, a rack and pinion connection between said beam and said shaft, a wheel on said shaft having two stepped flanges, a rod suspended on a knife edge from said beam and weighted to be in unstable equilibrium, said rod carrying two stepped elements, four stepped feeler levers, a first pair of feelers normally resting on two of said feeler levers, a second pair of feelers normally resting on the other two of said feeler levers, selector carrying bell cranks one connected to each feeler of the second pair, a selector carried by each bell crank, means on the feelers of the first pair for affecting the positions of said selectors with respect to their bell cranks, under predetermined conditions, a printing mechanism whose setting is governed by the positions of said feelers levers' steps, manually controlled means for effecting the positioning and action of said feeler levers and for operating the printing mechanism, the first pair of feelers having lateral movement with respect to said flanged wheel, and means including a feeler guide for effecting said lateral movement upon rotation of said flanged wheel after said feelers shall have been brought into operative engagement with the steps of the wheel.

7. In a weighing apparatus, a weighing beam, a rotatable shaft, a rack and pinion connection between said beam and said shaft, a wheel on said shaft having two stepped flanges, a rod suspended on a knife edge from said beam and weighted to be in unstable equilibrium, said rod carrying two stepped elements, four stepped feeler levers, a first pair of feelers normally resting on two of said feeler levers, a second pair of feelers normally resting on the other two of said feeler levers, selector carrying bell cranks one connected to each feeler of the second pair, a selector carried by each bell crank, means on the feelers of the first pair for affecting the positions of said selectors with respect to their bell cranks, under predetermined conditions, a printing mechanism whose setting is governed by the positions of said feeler levers' steps, manually controlled means for effecting the positioning and action of said feeler levers and for operating the printing mechanism, said wheel having its flanges spaced apart a sufficient distance to permit a feeler to project between the flanges, and means to dis-align or eject the feelers from the flanges whereby they may be moved up by the height of one step beyond the deepest step of the flanges so as not to obstruct the free rotation of the wheel, under predetermined conditions.

8. In a weighing apparatus, a weighing beam, a rotatable shaft, a rack and pinion connection between said beam and said shaft, a wheel on said shaft having two stepped flanges, a rod suspended on a knife edge from said beam and weighted to be in unstable equilibrium, said rod carrying two stepped elements, four stepped feeler levers, a first pair of feelers normally resting on two of said feeler levers, a second pair of feelers normally resting on the other two of said feeler levers, selector carrying bell cranks one connected to each feeler of the second pair, a selector carried by each bell crank, means on the feelers of the first pair for affecting the positions of said selectors with respect to their bell cranks, under predetermined conditions, a printing mechanism whose setting is governed by the positions of said feeler levers' steps, manually controlled means for effecting the positioning and action of said feeler levers and for operating the printing mechanism, said wheel having its flanges spaced apart a sufficient distance to permit a feeler to project between the flanges, and means to dis-align or eject the feelers from the flanges whereby they may be moved up by the height of one step beyond the deepest step of the flanges so as not to obstruct the free rotation of the wheel, under predetermined conditions, and means to lock the printing mechanism when one or both feelers are ejected from the wheel.

9. In a weighing apparatus, a weighing beam, a rotatable shaft, a rack and pinion connection between said beam and said shaft, a wheel on said shaft having two stepped flanges, a rod suspended on a knife edge from said beam and weighted to be in unstable equilibrium, said rod carrying two stepped elements, four stepped feeler levers, a first pair of feelers normally resting on two of said feeler levers, a second pair of feelers normally resting on the other two of said feeler levers, selector carrying bell cranks one connected to each feeler of the second pair, a selector carried by each bell crank, means on the feelers of the first pair for affecting the positions of said selectors with respect to their bell cranks, under predetermined conditions, a printing mechanism whose setting is governed by the positions of said feeler levers' steps, manually controlled means for effecting the positioning and action of said feeler levers and for operating the printing mechanism, said wheel having its flanges spaced apart a sufficient distance to permit a feeler to project between the flanges, and means to dis-align or eject the feelers from the flanges whereby they may be moved up by the height of one step beyond the deepest step of the flanges so as not to obstruct the free rotation of the wheel, under predetermined conditions, said feeler-ejecting means including a guide having triangular slots through which the feelers of the first pair project and by which on rotation of the wheel the feelers are moved transversely of the planes of the wheel's flanges.

10. In a weighing apparatus, having a weighing beam, the combination with said beam of a rod pendently supported from said beam, a rotary shaft, means operatively connecting said beam and said shaft whereby said shaft is turned in proportion to the movement of said beam, two actuating mechanisms each including feelers and stepped elements, a printing mechanism governed by said actuating mechanisms, said actuating mechanisms respectively cooperating with said rotary shaft and said pendently supported rod, and means for effecting the operation of said printing mechanism according to the position of said stepped elements, said feelers each being composed of a length of wire looped intermediate its ends and there provided with means for spreading the loop to increase the over-all lengths of the feeler, when desired.

11. In a weighing apparatus, having a weighing beam, the combination with said beam of a rod pendently supported from said beam, a rotary shaft, means operatively connecting said beam and said shaft whereby said shaft is turned in proportion to the movement of said beam, two actuating mechanisms each including feelers and stepped elements, a printing mechanism governed by said actuating mechanisms, said actuating mechanisms respectively cooperating with said rotary shaft and said pendently supported rod, means for effecting the operation of said printing mechanism according to the position of said stepped elements, said feelers each being composed of a length of wire looped intermediate its ends and there provided with means for spreading the loop to increase the over-all lengths of the feeler, when desired, and a fixed slotted guide into which said loops project to hold the feelers against turning.

12. In weighing apparatus, a weighing beam and a printing mechanism, two sets of stepped elements, operative connections between said beam and said sets of stepped elements whereby said sets of stepped elements are positioned according to the various positions of the weighing beam, a first and a second actuating and controlling mechanism, each comprising sets of feelers and stepped feeler levers, said feeler levers by their positions governing the operation of the printing mechanism, one set of feeler levers cooperating directly with one set of stepped elements, selectors for cooperatively connecting the other set of feelers with the other set of stepped elements, said printing mechanism including type wheels and type-wheel rods and a printing hammer, and means including cams for actuating said feelers, said type-wheel rods and said hammer, said type-wheel rods having loops and means located at said loops for spreading the loops to increase the over-all lengths of the rods when desired.

13. In weighing apparatus, a weighing beam and a printing mechanism, two sets of stepped elements, operative connections between said beam and said pairs of stepped elements whereby said sets of stepped elements are positioned according to the various positions of the weighing beam, a first and a second actuating and controlling mechanism, each comprising sets of feelers and stepped feeler levers, said feeler levers by their positions governing the operation of the printing mechanism, one set of feeler levers cooperating directly with one set of stepped elements, selectors for cooperatively connecting the other set of feelers with the other set of stepped elements, said printing mechanism including type wheels and type-wheel rods and a printing hammer, means including cams for actuating said feelers, said type-wheel rods and said hammer, said type-wheel rods having loops and means located at said loops for spreading the loops to increase the over-all lengths of the rods when desired, and a fixed slotted guide into which said loops project to hold said rods from turning.

14. In weighing apparatus, a weighing beam and a printing mechanism, two sets of stepped elements, operative connections between said beam and said pairs of stepped elements whereby said sets of stepped elements are positioned according to the various positions of the weighing beam, a first and a second actuating and controlling mechanism, each comprising sets of feelers and stepped feeler levers, said feeler levers by their positions governing the operation of the printing mechanism, one set of feeler levers cooperating directly with one set of stepped elements, selectors for cooperatively connecting the other set of feelers with the other set of stepped elements, said printing mechanism including type wheels and type-wheel rods and a printing hammer, means including cams for actuating said feelers, said type-wheel rods and said hammer, said type-wheel rods having loops and means located at said loops for spreading the loops to increase the over-all lengths of the rods when desired, a fixed slotted guide into which said loops project to hold said rods from turning, said rod-actuating means being connected to said loops, and a slotted guide for said rods, the rods being resilient, whereby said rods can be bent outwardly when desired.

15. In a weighing apparatus, a weighing beam, a rotatable shaft, a rack and pinion connection between said beam and said shaft, a wheel on said shaft having two stepped flanges, a rod suspended on a knife edge from said beam and weighted to be in unstable equilibrium, said rod carrying two stepped elements, four stepped feeler levers, one pair of feelers normally resting on two of said feeler levers, a second pair of feelers normally resting on the other two of said feeler levers, selector carrying bell cranks one connected to each feeler of the second pair, a selector carried by each bell crank, means on the feelers of the first pair for effecting the positions of said selectors with respect to their bell cranks, under predetermined conditions, a printing mechanism whose setting is governed by the positions of said feeler levers' steps, and manually controlled means for effecting the positioning and action of said feeler levers and for operating the printing mechanism, said feelers where they rest on the feeler levers being provided with spring loaded straps by virtue of which as the feeler levers act to raise the feelers they will precompress the springs and through the springs act on the feelers.

16. In weighing apparatus having a weighing beam, a printing mechanism including type rods, two controlling mechanisms each including feelers, stepped feeler levers and feeler-position-governing stepped elements positioned by the beam movements, said type rods adapted to cooperatively engage with the steps of said feeler levers, and controlled means to operate said type rods and set said feeler levers and feelers, said controlled means including resilient yieldable connections adapted to yield when said type rods shall have engaged the teeth of said feeler levers and said means continues its movement.

17. In weighing apparatus, having a weighing beam, a printing mechanism, two controlling mechanisms each including feelers and stepped elements, means governed by said beam for operating said controlling mechanisms successively after being adjusted by the scale with a short intervening period of time, means whereby the first controlling mechanism controls the setting of the stepped elements of the second controlling device to be actuated, means to effect operation of said printing mechanism according to the setting of said controlling mechanisms, and manually actuated means for causing the type wheels of the printing mechanism to remain in their set position for repeating the printing act.

18. In weighing apparatus having a weighing beam, a printing mechanism, two controlling mechanisms each including feelers and stepped elements, means governed by said beam for operating said controlling mechanisms successively after being adjusted by the scale with a short intervening period of time, means whereby the first controlling mechanism controls the setting of the stepped elements of the second controlling device to be actuated, means to effect operation of said printing mechanism according to the setting of said controlling mechanisms, said printing mechanism including type wheels and type-wheel actuating rods, and means in the case of intentional repetition of the printing act for holding the type-wheel rods in their set position.

19. In weighing apparatus having a weighing beam, a printing mechanism, two controlling mechanisms each including feelers and stepped elements, means governed by said beam for operating said controlling mechanisms successively after being adjusted by the scale with a short intervening period of time, means whereby the first controlling mechanism controls the setting of the stepped elements of the second controlling device to be actuated, means to effect operation of said printing mechanism according to the setting of said controlling mechanisms, said printing mechanism including type wheels and type-wheel actuating rods, means in the case of intentional repetition of the printing act for holding the type-wheel rods in their set position, and means automatically to disengage the repeating device during the repeat-printing against being again intentionally actuated, for multiple printing.

20. In weighing apparatus, a weighing beam and a printing mechanism, two sets of stepped elements, operative connections between said beam and said pairs of stepped elements whereby said sets of stepped elements are positioned according to the various positions of the weighing beam, a first and a second actuating and controlling mechanism, each comprising sets of feelers and stepped feeler levers, said feeler levers by their positions governing the operation of the printing mechanism, one set of feeler levers cooperating directly with one set of stepped elements, selectors for cooperatively connecting the other set of feelers with the other set of stepped elements, said printing mechanism including type wheels and type-wheel rods and a printing hammer, and means including cams for actuating said feelers, said type-wheel rods and said hammer, the connection between said cams and said feeler levers including resiliently yielding elements so that they yield when repeating the printing without the feeler levers themselves being moved.

21. In weighing apparatus of the character described wherein feelers engage stepped elements and feeler levers have steps to be engaged by type rods; said steps being so shaped and the rods having points so shaped that when the rod points meet the feeler lever steps the latter are moved backwardly by a fraction of the pitch so that the feelers are relieved and thus fall back from the engaging plane and from the first-mentioned stepped elements.

22. The apparatus of claim 1 wherein the printing mechanism is actuated by means of a printing handle and means by which the printing operation is performed indirectly through the interposition of a resilient medium, so that no forces greater than those determined by the resilient medium can act on the mechanism and the printing operation cannot be interfered with from the outside of the machine.

23. The apparatus of claim 1 wherein a speed governor controls the impression taking part of the printing mechanism.

24. The apparatus of claim 1 wherein the printing mechanism is actuated by means of a printing handle and means by which the printing operation is performed indirectly through the interposition of a resilient medium, so that no forces greater than those determined by the resilient medium can act on the mechanism and the printing operation cannot be interfered with from the outside of the machine, and means by virtue of which the impression taking act can commence only after the power has been stored completely in the resilient medium, so that a partial impression taking due to a defective operation is avoided.

25. The apparatus of claim 1 wherein the printing mechanism is actuated by means of a printing handle and means by which the printing operation is performed indirectly through the interposition of a resilient medium, so that no forces greater than those determined by the resilient medium can act on the mechanism and the printing operation cannot be interfered with from the outside of the machine, and means by virtue of which the impression taking act can commence only after the power has been stored completely in the resilient medium, so that a partial impression taking due to a defective operation is avoided, there being a delay period between the termination of the storing of the power and the release of the impression mechanism sufficient to provide the necessary time, in the case of scales actuated by persons weighing themselves, for the scale, which has been in motion due to said actuation, to come to rest.

26. The apparatus of claim 1, in which the scale is provided with an additional device for enlarging the measuring range, which device comprises an interrupted type rod and a weighted lever cooperatively connected to the interrupted type rod, the arrangement being such that the length of the type rod is varied according to the added weight on the weighted lever so that there is printed the weight formed by the normal indication plus the additional amount.

27. In a weighing apparatus, a weighing beam, a rotatable shaft, a rack and pinnion connection between said beam and said shaft, a wheel on said shaft having two stepped flanges, a rod suspended on a knife edge from said beam and weighted to be in unstable equilibrium, said rod carrying two stepped elements, four stepped feeler levers, a first pair of feelers normally resting on two of said feeler levers, a second pair of feelers normally resting on the other two of said feeler levers, selector carrying bell cranks one connected to each feeler of the second pair, a selector carried by each bell crank, means on the feelers of the first pair for effecting the positions of said selectors with respect to their bell cranks, under predetermined conditions, a printing mechanism including type rods whose setting is governed by the positions of said feeler levers' steps, and manually controlled means for effecting the positioning and action of said feeler levers and for operating the printing mechanism, the cross sections of the feelers being between 3 and 0.08 sq. mm., the pressure of the feelers against the steps being between 10 and 0.2 gr., the tangential step pitch of the said rod's steps being between 1 and 0.2 mm., the radial step pitch of the steps of the stepped flanges being between 1 and 0.1 mm., the axial thickness of the stepped flanges of the wheel being between 1 and 0.1 mm., the cross section of the type rods being from 8 to 1.5 sq. mm., and the path of the type rods being from 10 to 5 mm.

ARMIN WIRTH.

REFERENCES CITED

The following references are of record in the file of this patent:

UNITED STATES PATENTS

| Number | Name | Date |
|---|---|---|
| 1,749,192 | Osgood et al. | Mar. 4, 1930 |
| 1,880,314 | Cook | Oct. 4, 1932 |
| 2,036,026 | Doty | Mar. 31, 1936 |
| 2,040,073 | Brendel | May 12, 1936 |
| 2,070,011 | Hadley et al. | Feb. 9, 1937 |
| 2,172,618 | Kuppenbender et al. | Sept. 12, 1939 |